United States Patent [19]
Zinski

[11] Patent Number: 5,452,909
[45] Date of Patent: Sep. 26, 1995

[54] VEHICLE DOLLY

[76] Inventor: Michael D. Zinski, 5445 Jackson Dr., Apt. 213, Mounds View, Minn. 55014

[21] Appl. No.: 342,895

[22] Filed: Nov. 21, 1994

[51] Int. Cl.⁶ ........................................................ B62B 3/10
[52] U.S. Cl. ........................ 280/79.4; 248/349.1; D34/23
[58] Field of Search ............................ 280/79.11, 79.4, 280/79.5, 79.6, 79.7; 211/19, 20, 23; 244/50; 248/349; D12/94, 202; D34/5, 23

[56] References Cited

U.S. PATENT DOCUMENTS

| | | | |
|---|---|---|---|
| D. 269,216 | 5/1983 | Greenheck | D34/23 |
| 577,471 | 2/1897 | Ward | 280/79.11 X |
| 1,754,094 | 4/1930 | Glass, Sr. | 248/349 X |
| 1,898,641 | 2/1933 | Mugnani | 248/349 |
| 2,232,744 | 2/1941 | Thames | 280/79.4 X |
| 2,246,882 | 6/1941 | Gentry | 280/79.4 X |
| 2,277,787 | 3/1942 | Scott | 280/79.4 X |
| 2,337,670 | 12/1943 | Tourneau | 248/349 X |
| 3,281,883 | 11/1966 | Glantz | 248/349 X |
| 4,653,710 | 3/1987 | Dickison | D34/23 X |

FOREIGN PATENT DOCUMENTS

| | | | |
|---|---|---|---|
| 449911 | 3/1913 | France | 280/79.4 |
| 695455 | 12/1930 | France | 280/79.4 |
| 1150841 | 5/1969 | United Kingdom | 280/79.11 |

Primary Examiner—Brian L. Johnson

[57] ABSTRACT

A vehicle dolly having a central hub, with a plurality of leg members projecting radially of the central hub, and each of the leg members having a caster wheel to support the central hub, and a support hub rotatably mounted to the central hub, with the support hub having a concave top wall, and the concave top wall having spaced guard rails to secure a vehicle wheel therebetween.

2 Claims, 4 Drawing Sheets

VEHICLE DOLLY

TECHNICAL FIELD

The field of invention relates to vehicle support structure, and more particularly pertains to a new and improved vehicle dolly permitting ease of positioning and manipulation of a vehicle permitting the support and repositioning of a vehicle as desired.

BACKGROUND OF THE INVENTION

Various vehicle dolly structure, such as for a truck wheel, is indicated in U.S. Pat. No. 3,836,027. U.S. Pat. No. 3,756,616 sets forth a dolly block for supporting an axle hub therein, with the dolly block being provided with spaced axle support structure.

U.S. Pat. No. 4,976,449 and U.S. Pat. No. 5,039,123 are further examples of wheel dolly structures.

SUMMARY OF THE INVENTION

The vehicle dolly of the invention employs a truck structure, such that a central hub includes a plurality of radiating legs extending therefrom, with each of the legs having a caster wheel extending therebelow, with each caster wheel having a support axle directed into the respective leg member, with the support axles arranged in a parallel relationship relative to one another. The central hub pivotally mounts thereon a support hub, with the support hub pivotally mounted to the central hub, and the support hub having secured thereto an arcuate support flange receiving a wheel member of a vehicle thereon.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
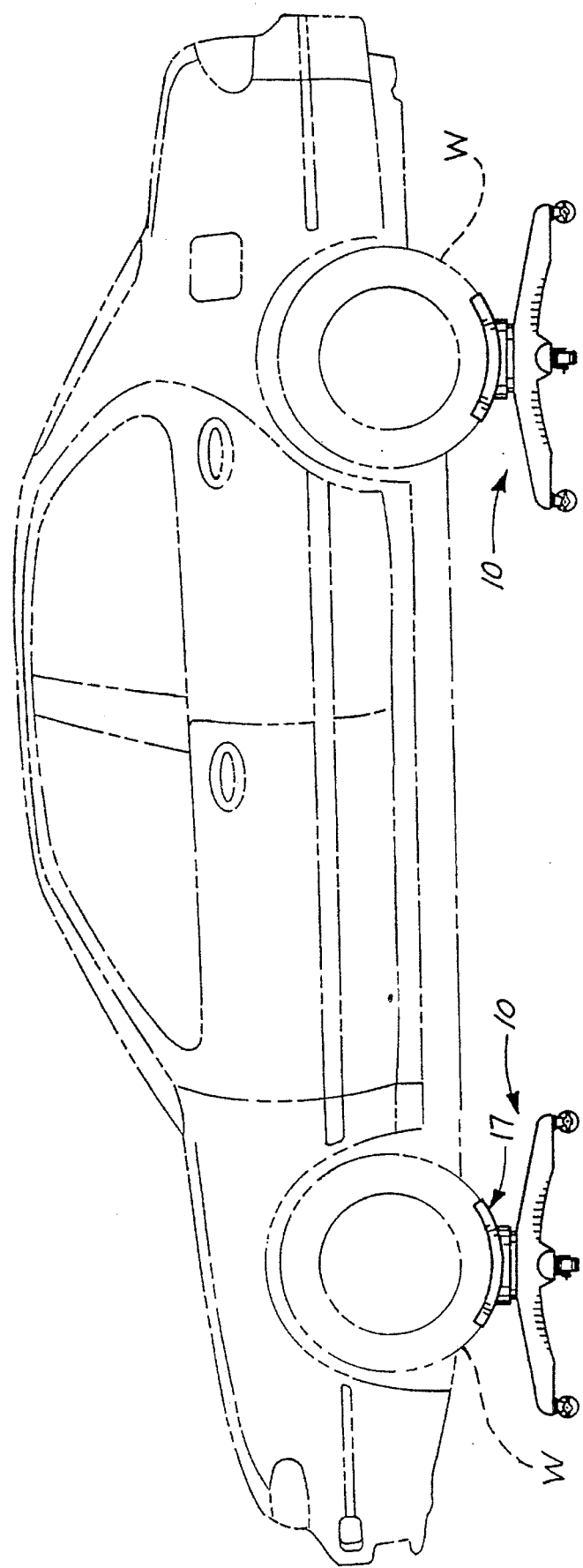
FIG. 1 is an orthographic view of the invention in use.
Figure 2:
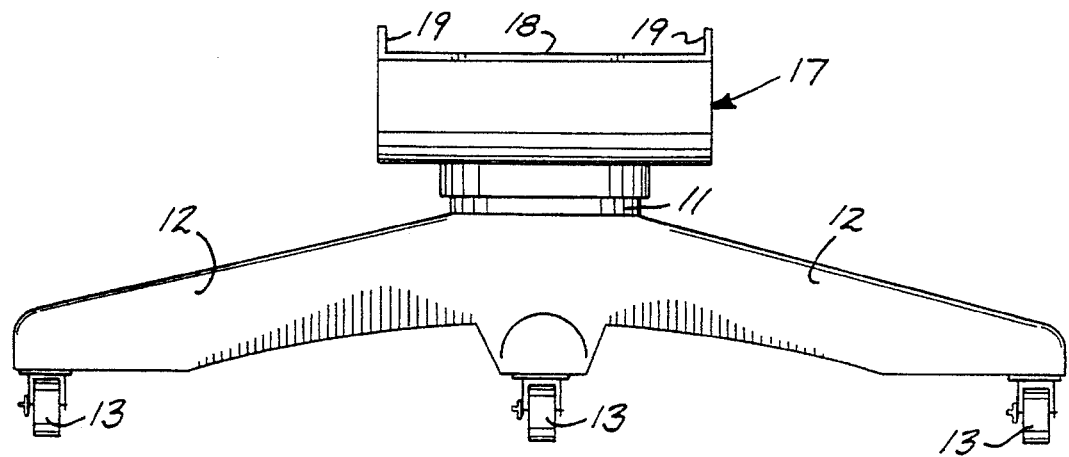
FIG. 2 is an orthographic side view of the invention.
Figure 3:
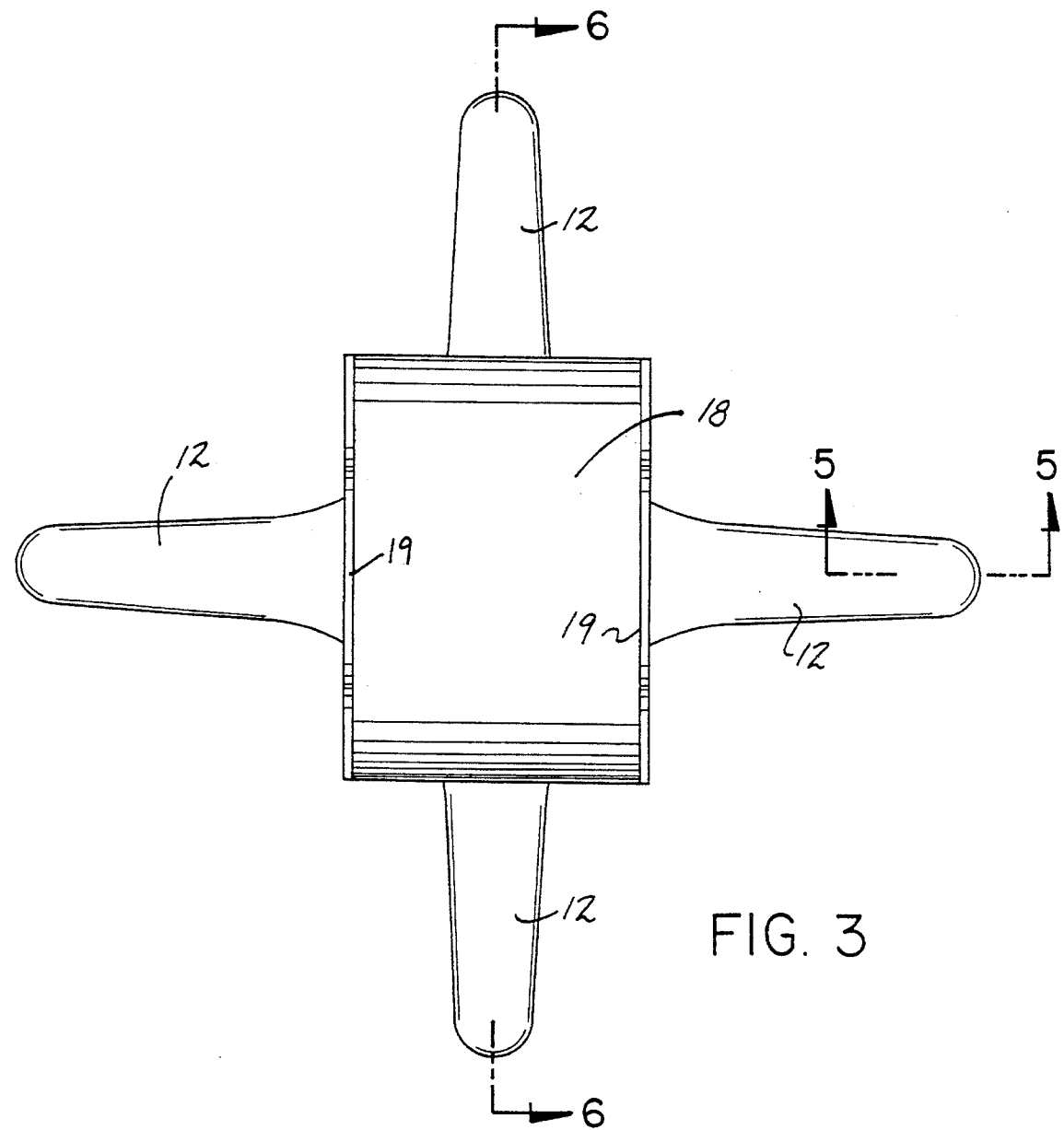
FIG. 3 is an orthographic top view of the invention.
Figure 4:
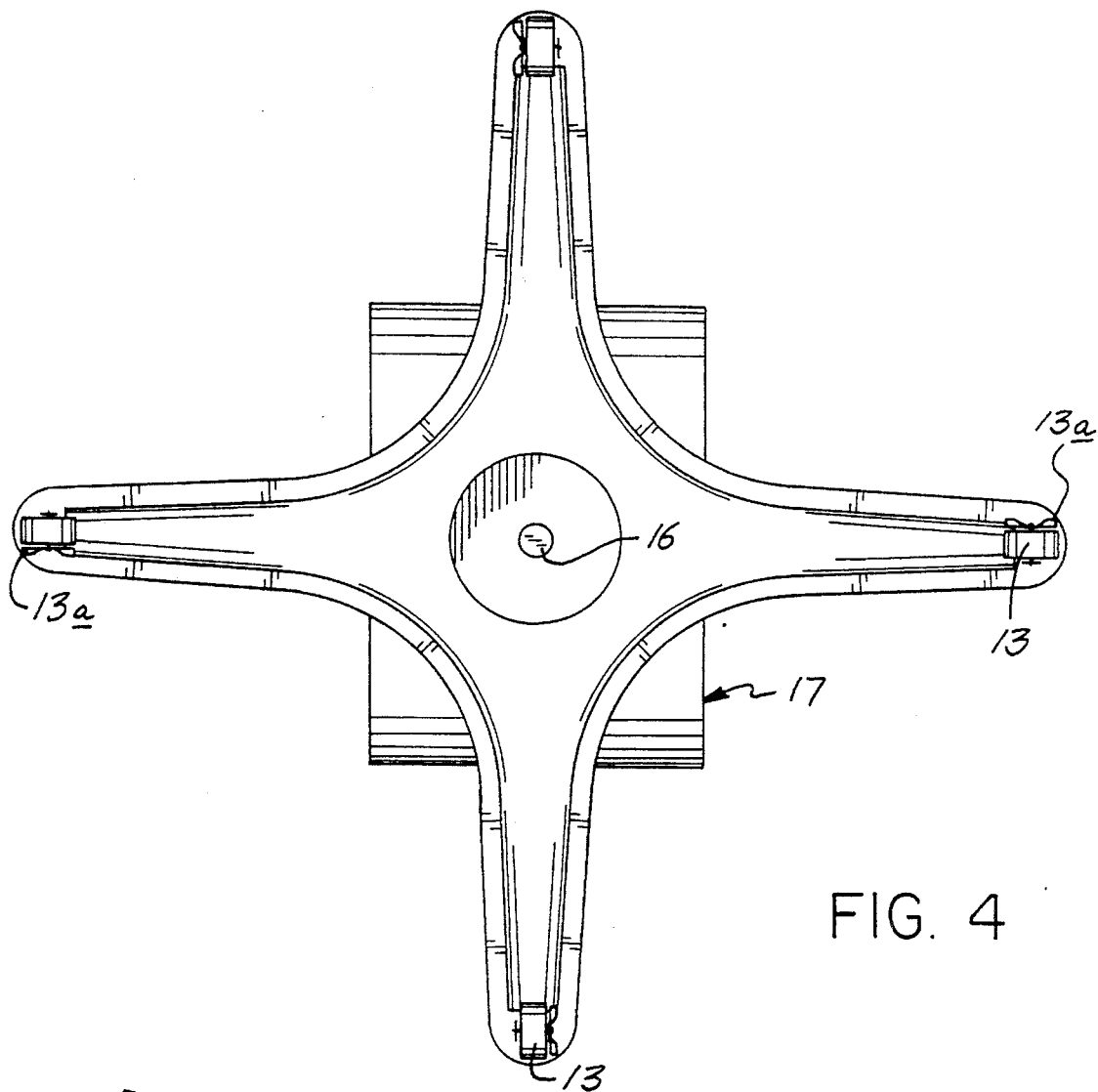
FIG. 4 is an orthographic bottom view of the invention.
Figure 5:
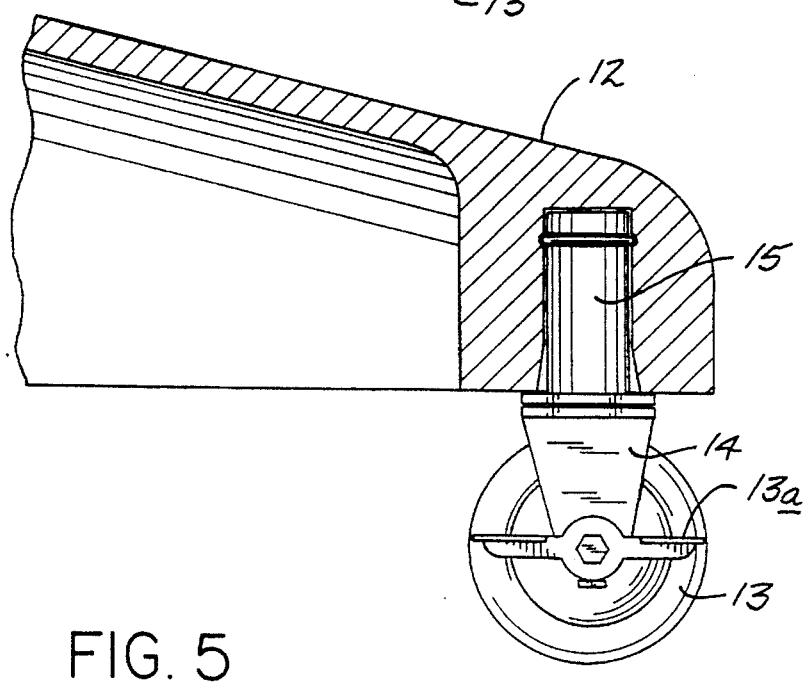
FIG. 5 is an orthographic view, taken along the lines 5—5 of FIG. 3 in the direction indicated by the arrows.
Figure 6:
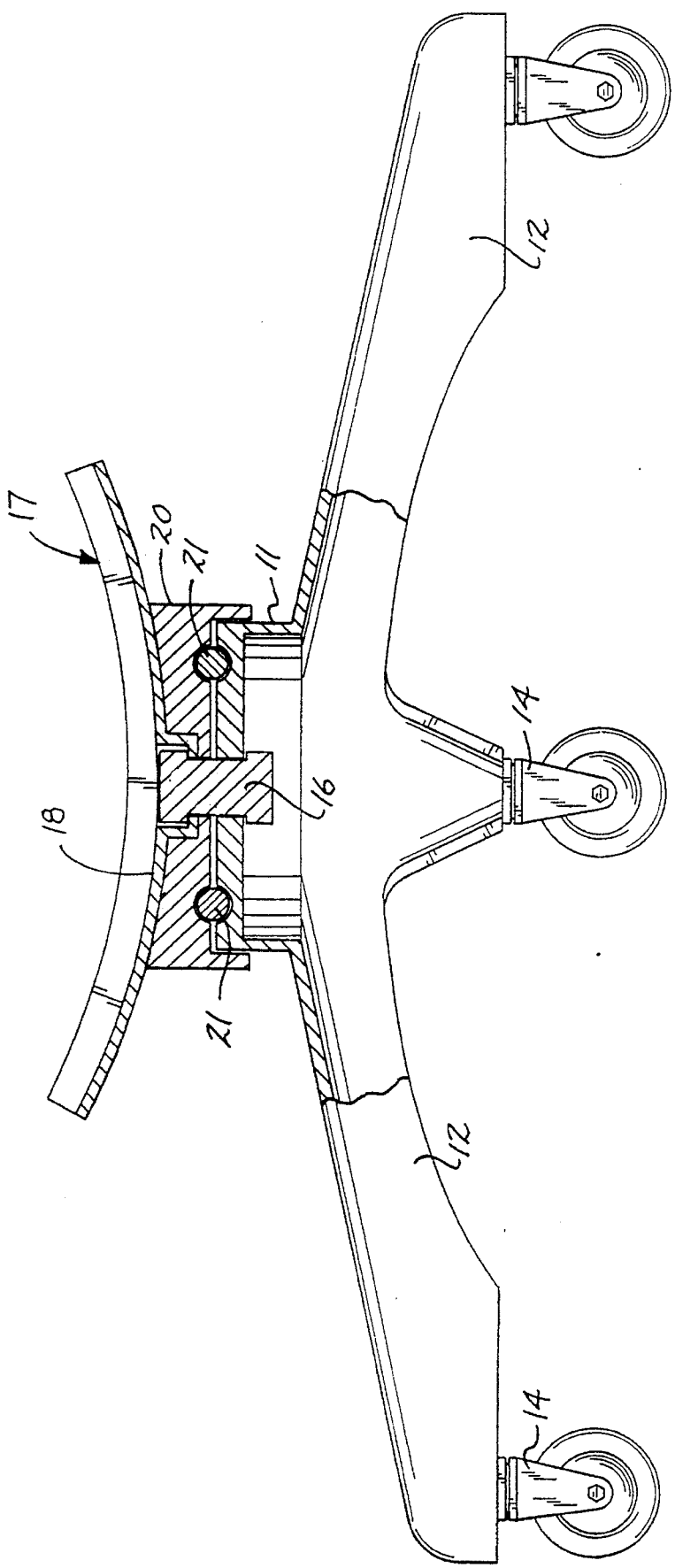
FIG. 6 is an orthographic view, taken along the lines 6—6 of FIG. 3 in the direction indicated by the arrows.

The vehicle dolly 10 of the invention is arranged to support a vehicle wheel "W" and to this end, an individual vehicle dolly 10 is employed relative to each wheel of an associated vehicle, as illustrated in FIG. 1. Each vehicle dolly 10 employs a central hub 11, with a plurality of leg members 12 radiating therefrom, with the leg members typically spaced apart an equal arcuate angle, with at least three such leg members employed, wherein four leg members are illustrated for purposes of support, but it is understood that at least three are required. A caster wheel 13 rotatably mounted relative to a caster wheel yoke 14 that in turn is rotatably mounted to an individual leg member 12 is provided, with each yoke having a support axle 15 extending into a bottom surface of an adjacent outermost distal end of an associated leg member 12, in a manner as illustrated in FIG. 5. A locking mechanism is employed, such as a friction lock 13a and the like as illustrated in FIG. 5 for optional employment by the invention. Each of the caster wheel support axles 15 are arranged parallel relative to one another. A support hub 20 is provided, with the support hub rotatably mounted relative to the central hub 11 about a hub axle 16, with the hub axle 16 oriented medially, symmetrically, and coaxially of each of the caster wheel support axles 15. The support hub 20 has fixedly secured thereto an arcuate support flange 17, with the support hub 20 fixedly mounted medially to a bottom wall convex wall of the support flange 17, with the support flange 17 further provided with a concave top wall 18 to receive a wheel "W". Spaced guard walls 19 extend along each side and project above the concave top wall 18 of the associated support flange 17. As illustrated in FIG. 6, bearing members 21 assist in rotatably mounting the support hub 20 to the central hub 11 and to this end, the hub axle 16 is also oriented medially of the support flange 17 to provide for ease of symmetrical support of a vehicle when the wheel "W" is positioned thereon, such as illustrated in FIG. 1.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by Letters Patent of the United States is as follows:

1. A vehicle dolly, comprising, a central hub, the central hub including a plurality of leg members radiating and projecting exteriorly of the central hub, the leg members spaced apart an equal arcuate spacing relative to one another, and each of the leg members including an outermost distal end, and a plurality of caster wheels, with one of said caster wheels rotatably mounted relative to one of said leg members adjacent said distal end, and each of said caster wheels having a support axle of a plurality of support axles, and the support axles are arranged parallel relative to one another, and the central hub having an arcuate support flange, a support hub and a hub axle oriented medially and directed through the central hub and the hub axle rotatably mounting the support hub to the central hub, and the support flange fixedly secured medially of the support hub, and the hub axle oriented parallel to and medially of the support axle, the support flange includes a concave top wall and a convex bottom wall, and the support hub is fixedly secured medially of the convex bottom wall, and the convex top wall having spaced guard walls positioned on opposed sides and projecting from the concave top wall and projecting above the concave top wall.

2. A vehicle dolly as set forth in claim 1 including bearing means positioned between the support hub and the central hub to rotatably mount the support hub to the central hub.

* * * * *